United States Patent [19]

Freed, Jr. et al.

[11] 4,089,403
[45] May 16, 1978

[54] SWIVEL ASSEMBLY FOR A CONVEYOR

[75] Inventors: Donald L. Freed, Jr.; Gerald L. Baum, both of Belleville, Ill.

[73] Assignee: National Mine Service Company, Pittsburgh, Pa.

[21] Appl. No.: 740,300

[22] Filed: Nov. 9, 1976

[51] Int. Cl.² .................. B65G 21/14; B65G 41/00
[52] U.S. Cl. .............................. 198/316; 198/317; 198/864
[58] Field of Search ............ 198/314, 316, 317, 587, 198/590, 862, 864, 865; 193/35 J, 10; 299/57, 64; 105/3, 4 R

[56] References Cited
U.S. PATENT DOCUMENTS

| | | | |
|---|---|---|---|
| 2,208,269 | 7/1940 | Cartlidge | 198/864 X |
| 2,210,655 | 8/1940 | Doberstein | 198/864 |
| 2,690,834 | 10/1954 | Lundquist | 198/864 |
| 2,743,002 | 4/1956 | Cartlidge | 198/864 |
| 2,910,169 | 10/1959 | Russell | 198/864 |
| 3,557,937 | 1/1971 | Kahre | 198/864 X |
| 3,750,863 | 8/1973 | Dyczynski | 198/851 |
| 3,987,890 | 10/1976 | Merrit t | 198/316 |

*Primary Examiner*—Evon C. Blunk
*Assistant Examiner*—James L. Rowland
*Attorney, Agent, or Firm*—Stanley J. Price, Jr.; John M. Adams

[57] ABSTRACT

A mining machine having a body portion mounted on propelling tracks includes an endless conveyor mechanism positioned on a conveyor support frame that extends longitudinally on the body portion. The conveyor support frame includes a main conveyor section connected by a link member to a conveyor boom section arranged for lateral swinging movement relative to the main conveyor section. The main conveyor section and the conveyor boom section each include an integral gear member. The gear members of the respective sections are maintained in meshing relation by pivot pins interconnecting the link member with the respective sections. A hydraulic cylinder having an extensible piston rod preferably connects the conveyor boom section to the link member. Actuation of the hydraulic cylinder extends or retracts the piston rod to laterally swing the pivot connection of the conveyor boom section in a preselected direction relative to the pivot pin connection on the main conveyor section. Movement of the pivot pin connection on the conveyor boom section contemporaneously rotates the boom section gear member in the same preselected direction relative to the main conveyor section gear member, such that the conveyor boom section moves through twice the angle of rotation of the pivot pin connection of the conveyor boom section. Thus, the pivotal movement of the link member and the rotation of the conveyor boom section gear member laterally swings the conveyor boom section relative to the main conveyor section through an expanded arc.

14 Claims, 4 Drawing Figures

SWIVEL ASSEMBLY FOR A CONVEYOR

BACKGROUND OF THE INVENTION

1. Field of the Invention

This invention relates to a swivel assembly for connecting a conveyor boom section to a main conveyor section, and more particularly, to a conveyor swivel assembly for connecting the longitudinal main conveyor section of a mining machine with the conveyor boom section thereof.

2. Description of the Prior Art

In transporting mined material rearwardly on a mining machine by a longitudinal conveyor, it is the conventional practice to pivotally connect a conveyor boom section to a main conveyor section for lateral swinging movement to control the discharge of the mined material from the conveyor. The conveyor boom section is pivotally connected to the main conveyor by a vertical pivot pin. The conveyor boom is operable by a piston cylinder assembly to swing laterally relative to the main conveyor and discharge the dislodged material into a conventional haulage vehicle for removal from the mine.

U.S. Pat. No. 3,190,697 discloses a laterally swingable conveyor section for a continuous mining machine. Cutting elements of the mining machine dislodge the solid material from the mine face and a flexible flight conveyor extending rearwardly of the cutting elements transports the dislodged material to a conveyor boom section that is connected to the longitudinal main conveyor. The conveyor boom section is arranged to pivot relative to the main conveyor about a fixed vertical axis. In this manner, the conveyor boom section may be maintained in material transporting relationship with a conventional haulage vehicle as the mining machine is maneuvered through the mine.

A problem, however, is encountered with the above described apparatus in that the angle through which the boom conveyor may pivot is substantially limited. The angle through which the boom conveyor may pivot is limited by the dimensions of the swivel section that connects the boom conveyor to the main conveyor. An increase in the swinging angle of the boom conveyor requires a proportional increase in the dimensions of the swivel section. However, the dimensions of the swivel section between the two conveyors cannot be infinitely increased without encountering mechanical difficulties. Specifically, the size of the swivel connection between the two conveyors is limited by the extent to which the flexible side walls of the swivel section may be deformed to permit an enlarged swing of the boom conveyor relative to the main conveyor. Consequently, the extent to which the boom conveyor may be laterally swung relative to the main conveyor is limited by the swivel connection of the boom conveyor to the main conveyor and the geometry of the piston cylinder assembly and its attachments.

There is need for a swivel connection for pivotally connecting the conveyor boom section to the longitudinal main conveyor section of a continuous mining machine and for swinging the conveyor boom through a substantial pivotal angle without increasing the dimensions of the swivel section or requiring inelastic flexure of the flexible side walls of the conveyor or a cumbersome swing cylinder arrangement.

SUMMARY OF THE INVENTION

In accordance with the present invention there is provided a conveyor having a longitudinally extending main section and a longitudinally extending boom section disposed in end to end relationship in which the boom section section swings laterally to either side of the main section. The adjacent ends of the two sections are interconnected by a pivotal link member and a pair of meshing gears or gear segments forms an integral or fixed part of the respective conveyor sections. The link member is pivotally connected to the main conveyor section and one of the gear segments about a first pivot axis perpendicular to the direction of material flow on the main conveyor section. Similarly, the link member is pivotally connected to the conveyor boom section and the other gear segment about a second pivot axis perpendicular to the direction of material flow on the conveyor boom section. The first and second pivot axes are longitudinally spaced on the link member. As aforesaid, the gear for the main conveyor section is fixed relative thereto, so that as either gear segment rotates with respect to the other gear segment there is produced corresponding rotation of the respective conveyor section. The link member is arranged to pivot about the main conveyor section and the gear segment associated therewith around the first pivot axis and about the conveyor boom section and the gear segment associated therewith around the second pivot axis.

When the link member is pivoted about one of the axes on one of the respective conveyor sections, for example the main conveyor section, the pivot axis of the conveyor boom section moves through an arcuate path. At the same time the gear segment on the conveyor boom section rotates with respect to the gear on the main conveyor section causing the conveyor boom section to rotate. The combined effect of the arcuate movement of the second pivot axis on the conveyor boom section and the rotation of its gear segment is such that, for a given angular movement of the second pivot axis, there is produced twice the rotary angular movement of the conveyor boom section relative to the main conveyor section. Accordingly, the conveyor boom section swings through an arc twice the angle of rotation of the link member with respect to the main conveyor section. Therefore, while minimizing the angular rotation of the link member to one half the desired rotation of the conveyor boom section, full desired rotation of the conveyor boom section is accomplished.

Further, in accordance with the practice of the present invention there is provided a conveyor for a mining machine that includes a mining machine body portion mounted on devices for propelling the body portion. A conveyor support frame extends longitudinally on the body portion. A flexible continuous conveyor is positioned on the conveyor support frame. The conveyor support frame includes a main conveyor section joined in end to end relationship with a conveyor boom section. A link member pivotally links the adjoining ends to permit lateral swinging movement of the conveyor boom section relative to the main conveyor section. Also, gear devices, positioned in meshing relation, are fixedly secured to the conveyor boom section and the main conveyor section at their respective adjoining ends. Relative rotation of the meshing gears in a preselected direction provides for lateral swinging movement of the conveyor boom section through a preselected angle relative to the main conveyor section. An extensible mechanism preferably supported on the conveyor boom section is connected at one end portion to the link member. Actuation of the extensible mechanism arcuately moves the pivot connection between the link member and the conveyor boom section through a preselected angle relative to the pivot connection between the link member and the main conveyor section to thereby rotate the gear segment of the conveyor boom section relative to the gear segment of the main conveyor section.

The extensible mechanism includes a hydraulic cylinder assembly having a piston rod pivotally connected to the link member. Extension and retraction of the piston rod within the hydraulic cylinder rotates the pivot connection between the link member and the boom conveyor section a preselected angle about the pivot connection between the link member and the main conveyor section. Simultaneously, the gear segment fixed to the conveyor boom section rotates about the gear segment fixed to the main conveyor section. In this manner, the conveyor boom section portion swings laterally relative to the main conveyor section through an angle of increased magnitude, i.e., twice the preselected angle of rotation of the link member.

Accordingly, the principal object of the present invention is to provide an improved conveyor swivel section for connecting the boom member of a mining machine with the main longitudinal conveyor thereof and which is operable to swing the boom member laterally through an angle of substantial magnitude.

Another object of the present invention is to provide a swivel section for a mining machine conveyor that permits substantial lateral swinging movement of the conveyor boom section relative to the main conveyor section without requiring a relatively large swivel section.

A further object of the present invention is to provide a conveyor swivel section for the longitudinal conveyor of a mining machine for laterally swinging the conveyor boom section about a swivel section having relatively narrow dimensions and providing a substantial pivotal movement that does not necessitate bending the flexible sideboards at the conveyor swivel section to a small radius.

These and other objects of the present invention will be more completely described in the following specification and accompanying drawings and the appended claims.

DESCRIPTION OF THE PREFERRED EMBODIMENTS

Figure 1:
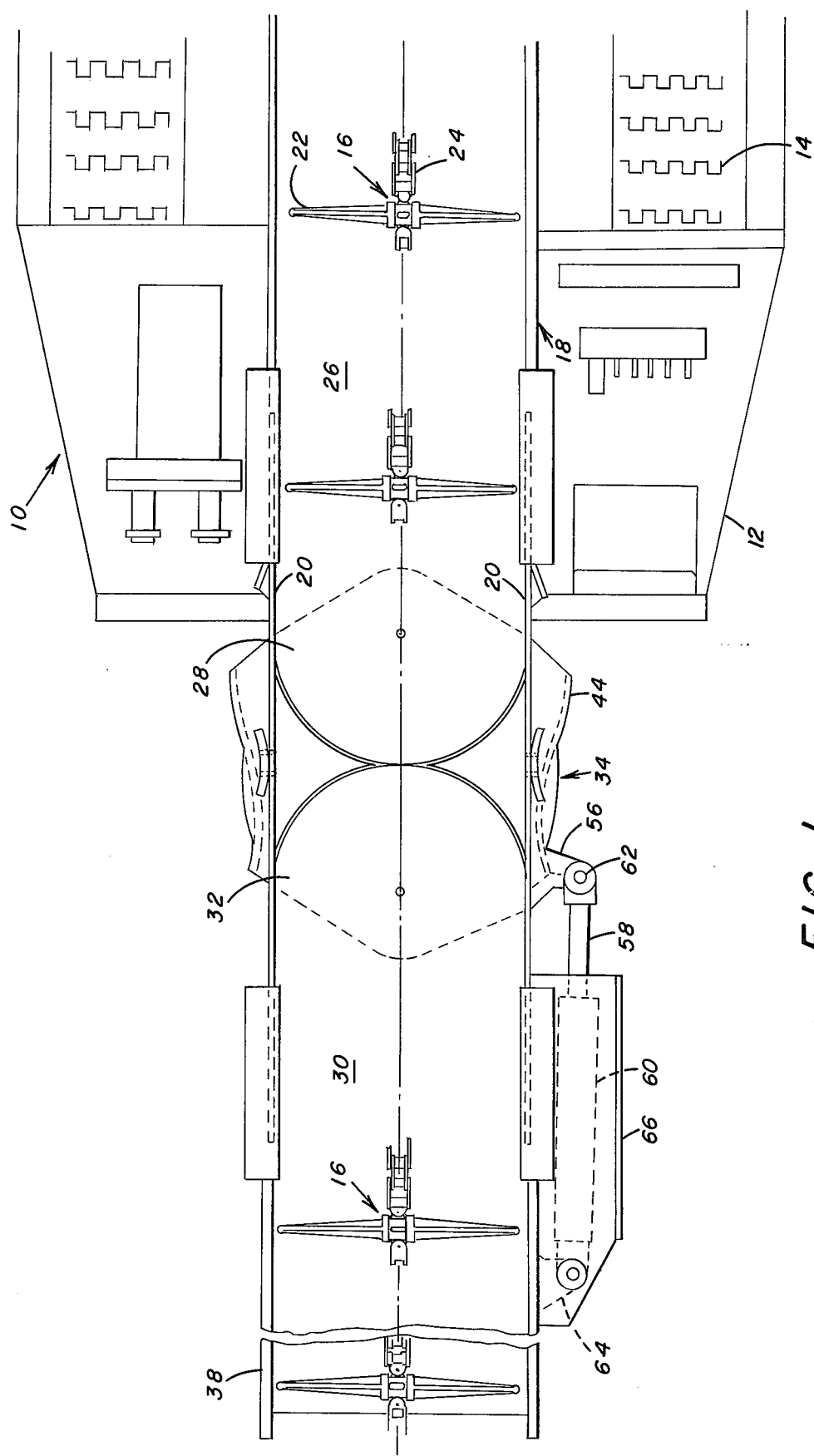
FIG. 1 is a schematic, fragmentary top plan view with portions removed or broken away for the sake of clarity, of a mining machine having a longitudinal conveyor with the conveyor swivel section of the present invention.

Referring to the drawings and particularly to FIG. 1, there is illustrated the rearward end portion of a mining machine generally designated by the numeral 10 that has a body or frame portion 12 suitably mounted on propelling devices 14, such as endless crawler tracks. Hydraulic motors (not shown) are mounted on the body portion 12 and are operable to propel the mining machine 10 on the endless crawler tracks 14 to advance the mining machine during the mining operation. A laterally flexible continuous conveyor mechanism generally designated by the numeral 16 is positioned on a conveyor support frame generally designated by the numeral 18 that extends longitudinally on the body portion 12. The conveyor mechanism 16 conveys material dislodged by the mining machine 10 from the front to the rear of the mining machine. A cutting element (not shown) such as a drum member is rotatably mounted on the forward end of the mining machine 10 and has cutting elements extending therefrom. As the mining machine 10 advances the cutter drum member into the mine face, solid material is dislodged and gathered from the mine floor by a gathering device (not shown) that extends forwardly from the body portion 12. The gathering device feeds the dislodged material onto the conveyor mechanism 16 to be conveyed rearwardly by the conveyor mechanism 16. The scope of the present invention does not include the operation of the cutter drum member of the mining machine which is explained in greater detail in U.S. Pat. No. 3,774,969.

The conveyor support frame 18 extends the length of the mining machine 10 and includes parallel, spaced, flexible sidewalls 20 that form with the upper surface or surfaces of support frame 18 a trough for receiving the conveyor mechanism 16. The conveyor mechanism 16 is a flexible flight-type chain conveyor that includes a plurality of longitudinally spaced flights 22 connected by lengths of chain 24, in a conventional manner, to permit the lengths of chain 24 to flex laterally about their connections to the flights 22. With this arrangement the cutter element of the continuous mining machine 10 dislodges material from the mine face and the conveyor mechanism 16 transports the dislodged material rearwardly on the upper surface or surfaces of support frame 18 between the conveyor sidewalls 20.

The conveyor support frame 18 includes a main conveyor section 26 having a discharging end portion 28 and a conveyor boom section 30 having a receiving end portion 32 positioned adjacent to the discharging end portion 28. The main conveyor discharging end portion 28 and the conveyor boom receiving end portion 32 are pivotally connected by a conveyor swivel section generally designated by the numeral 34 for lateral swinging movement of the conveyor boom section 30 relative to the main conveyor section 26 in accordance with the present invention. The conveyor boom section 30 together with the conveyor mechanism 16 positioned thereon are arranged to swing laterally in a preselected direction at the rearward end portion of the mining machine 10. The conveyor boom section 30 rotatably supports the conveyor chain 24 about a driven sprocket (not shown) and includes a discharging end portion 38. The dislodged material is transferred from the discharging end portion 38 onto a conventional section belt or into a suitable haulage vehicle for removal of the dislodged material from the mine.

Figure 3:
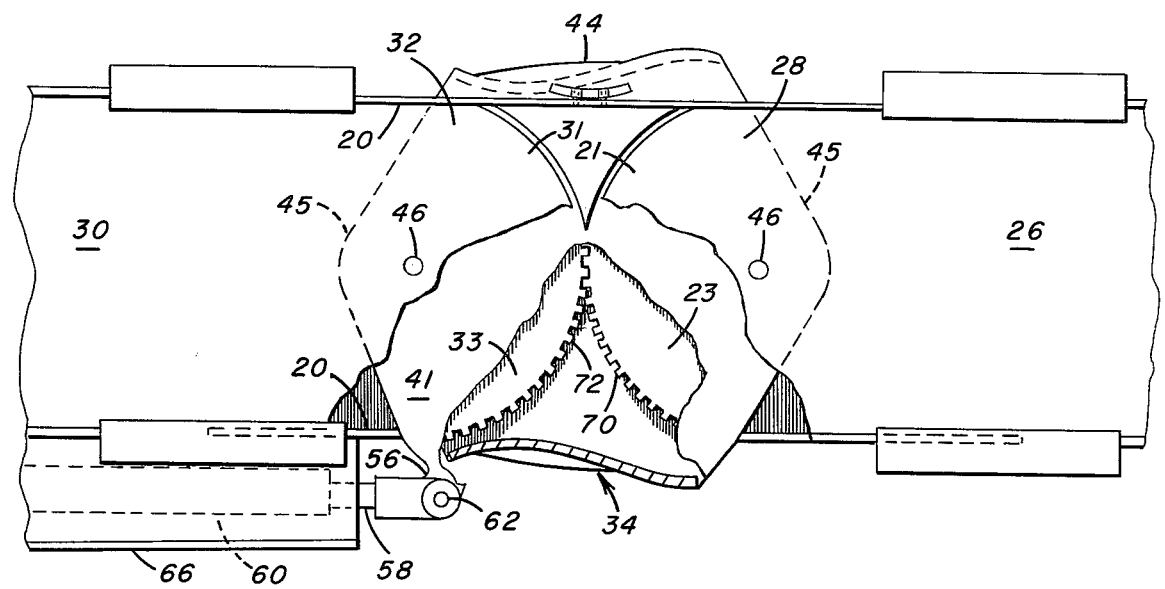
FIG. 3 is a schematic, fragmentary, partly sectional, enlarged top plan view of the conveyor swivel section pivotally connecting the conveyor boom to the main conveyor and having portions removed or broken away for the sake of clarity.

As illustrated in FIG. 3 and in greater detail in FIG. 4, main conveyor section 26 has integrally affixed at its discharging end portion 28 an upper semicircular extension plate 21, a semicircular gear or gear segment 23 located at a spaced distance below plate 21, a lower semicircular extension plate 25 and a lower rectangular extension plate 27 located at a spaced distance below plate 25. Similarly, conveyor boom section 30 has integrally affixed at its receiving end portion 32 an upper semicircular extension plate 31, a semicircular gear or gear segment 33 located at a spaced distance below plate 31, a lower semicircular extension plate 35 and a lower rectangular extension plate 37 located at a spaced distance below plate 35. Each of the corresponding plates and gears or gear segments on the respective sections are in alignment and are dimensioned such that, when gear segments 23 meshes with gear segment 33, upper semicircular plate 21 substantially abuts upper semicircular plate 31, lower semicircular plate 25 substantially abuts lower semicircular plate 35 and lower rectangular plate 27 has its end 29 spaced from end 39 of lower rectangular plate 37. However, each of the corresponding plates and gear segments substantially reside between the vertical sidewalls 20 of the respective sections. The conveyor boom section 30 is arranged for lateral swinging movement relative to the main conveyor section by the conveyor swivel section 34 in accordance with the present invention.

Figure 4:
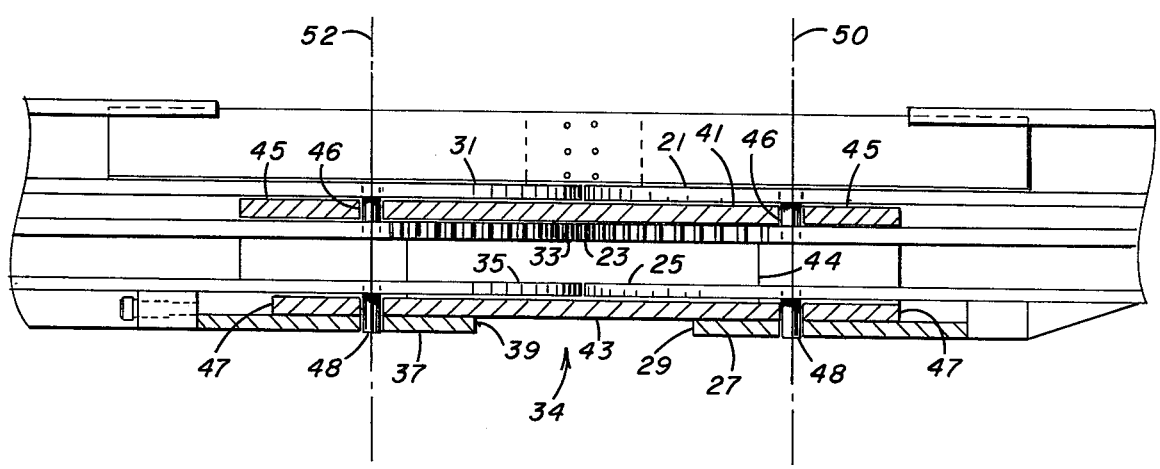
FIG. 4 is a schematic, fragmentary, partly sectional view in side elevation of the conveyor swivel section illustrated in FIG. 3 and also having portions removed or broken away for the sake of clarity.

Referring further to FIGS. 3 and 4, the conveyor swivel section 34 includes a link member 44 comprised essentially of an upper plate portion 41 of modified hexagonal configuration (FIG. 3) and a lower plate portion 43 of similar configuration. Attached to or formed integrally with plate portion 41 and 43 are other link portions, the function of which are to strengthen link member 44 and prevent the ingress of material that would jam the operation of swivel section 34 or movement of conveyor boom section 30 relative to main conveyor section 36.

As shown, link member 44 is positioned between main conveyor section 26 and conveyor boom section 30 with opposed, essentially triangular portions 45 of upper plate portion 41 disposed respectively between upper semicircular plate 21 and semicircular gear segment 23 of main conveyor section 26 and upper semicircular plate 31 and semicircular gear 33 of conveyor boom section 30. Similarly, opposed, essentially triangular portions 47 of lower plate portion 43 are disposed respectively between lower semicircular plate 25 and rectangular plate 27 of main conveyor section 26 and lower semicircular plate 35 and rectangular plate 37 of conveyor boom section 30.

A pair of upper pivots or pivot pins 46 pivotally interconnect upper triangular plate portions 45 between the upper semicircular plates 21 and 31 and semicircular gear segments 23 and 33 of main conveyor section 26 and conveyor boom section 30 respectively. Similarly, a pair of lower pivots or pivot pins 48 pivotally interconnect lower triangular plate portions 47 between the lower semicircular plates 25 and 35 and lower rectangular plates 27 and 37 of main conveyor section 26 and boom conveyor section 30 respectively. Upper pivots 46 and lower pivots 48 are vertically aligned and provide vertical pivots axes 50 and 52, as illustrated in FIG. 4. The pivots or pivot pins 46 and 48 pass loosely through link member 44 to interconnect the main conveyor section 26 with the conveyor boom section 30 for relative pivotal movement about the axes 50 and 52. The link member 44 includes an outwardly projecting ear 56 that is pivotally secured between the bifurcations of a piston rod 58 of a hydraulic cylinder 60 by a vertical pivot pin 62. The piston rod 58 is operable to extend and retract within the hydraulic cylinder 60. The hydraulic cylinder 60 is mounted by a bracket 64 (FIG. 1) to conveyor boom section 30.

The hydraulic cylinder 60 is contained within a housing 66 that is suitably mounted on conveyor boom section 30. The adjacent ends of the main conveyor section 26 and the conveyor boom section 30 are interconnected by a pair of gears or gear segments 23 and 33 having meshing gear teeth 70 and 72 respectively. The link member 44 is pivotally connected to the main conveyor section 26 and the gear segment 23 about the pivot axis 50 of pins 46 and 48 which axis is perpendicular to the direction of material flow on the main conveyor section. In a similar manner the link member 44 is pivotally connected to the conveyor boom section 30 and the other gear segment 33 about the pivot axis 52 of the pins 46 and 48, which axis is perpendicular to the direction of material flow on the conveyor boom section. The link member 44 is arranged to pivot about the main conveyor section 26 and the gear segment 23 around the pivot axis 50 and about the conveyor boom section 30 and the gear segment 33 around the pivot axis 52. With this arrangement, actuation of the hydraulic cylinder 60, to extend or retract the piston rod 58 connected to the pivot pin 62, rotates the pivot pins providing axis 52 about the pivot pins providing axis 50 and contemporaneously rotates the gear segment 33 with respect to gear segment 23 to produce a double corresponding angular rotation of the conveyor boom section.

Figure 2:
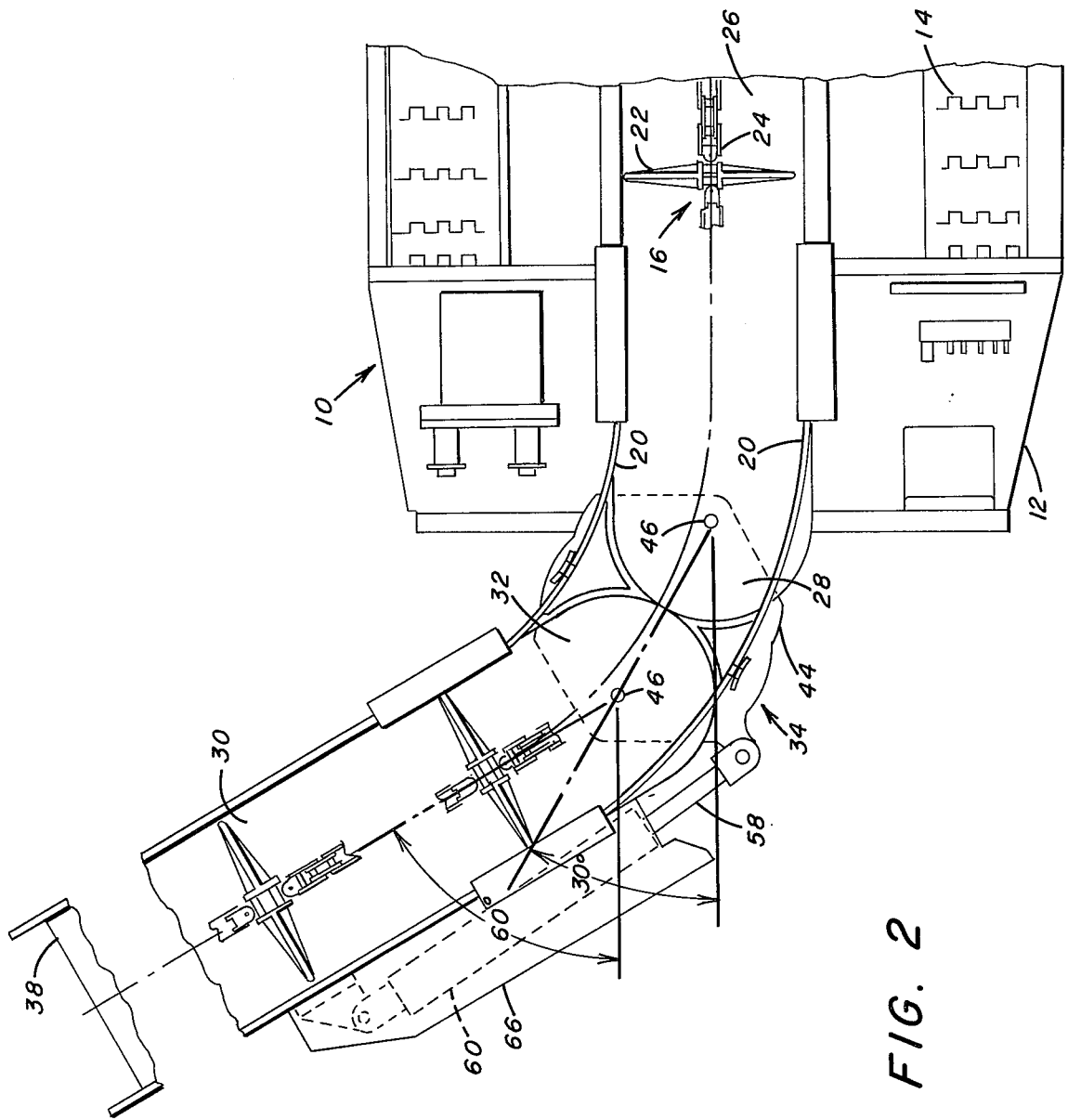
FIG. 2 is a schematic, fragmentary top plan view similar to FIG. 1, with portions removed or broken away for the sake of clarity, illustrating the conveyor boom swung laterally through a preselected angle relative to the main conveyor by operation of the conveyor swivel section in accordance with the present invention.

In operation as illustrated in FIG. 2, when the link member 44 is pivoted about one of the axes 50 or 52 on one of the conveyor sections, such as the main conveyor section 26, the pivot axis 52 or the pivot connection formed by pins 46 and 48 of the conveyor boom section 30 moves through an arcuate path. At the same time the gear segment 33 on the conveyor boom section 30 rotates with respect to the gear segment 23 on the main conveyor section 26 causing the conveyor boom section 30 to rotate. The combined effect of the arcuate movement of the pivot axis 52 or the pivot connection formed by pins 46 and 48 on the conveyor boom section 30 and the rotation of the gear segment 33 is such that, for a given angular movement of the pivot axis 52, there is produced twice the angular movement of the boom conveyor section 30 relative to the main conveyor section 26. Thus, the conveyor boom section 30 swings through an arc twice the angle of rotation of the link member 44 with respect to the main conveyor section 26. While minimizing the angular rotation of link member 44 to one half the desired rotation of the conveyor boom section 30, full desired rotation of the conveyor boom section is accomplished.

The direction of the swinging movement of the conveyor boom section 30 is controlled by operation of the hydraulic cylinder 60, and for example, clockwise rotation of the conveyor boom section 30 relative to the main conveyor section 26 through a preselected angle is controlled by the degree of extension of the piston rod 58 from the hydraulic cylinder 60. Accordingly, the link 44 and the pivot axis 52 rotate through the same angle of rotation relative to the main conveyor section 26. Because gear segment 23 is maintained in meshing relation with gear segment 33, there is produced corresponding rotation of gear segment 33. The link member 44 pivots in clockwise direction about the main conveyor section 26 and the gear segment 23 around the pivot axis 50. At the same time the gear segment 33 rotates with respect to gear segment 23 in a clockwise direction, and the conveyor boom section 30 swings through an arc twice the angle of rotation of the link member 44 with respect to the conveyor section 26. This is accomplished by the combined effects of the arcuate movement of pivot axis 52 on the conveyor boom section 30 and the rotation of the gear segment 33. Thus for a given angular movement of pivot axis 52, there is produced angular movement of conveyor boom section 30 which is twice the rotary movement of the gear segment 33 relative to gear segment 23 on the main conveyor section 26. Thus, the pivotal movement imparted to the conveyor boom section 30 relative to the main conveyor section 26 substantially increased by the conveyor swivel section 34 without requiring a large and cumbersome pivotal connection between the conveyor sections 26 and 30.

In a specific embodiment of the present invention, for example, outward extension of the piston rod 58 which rotates link member 44 in a clockwise direction through an angle of 30° relative to the main conveyor section 26 around pivot axis 50 produces a corresponding rotation of gear segment 33 relative to gear segment 23. Rotation of gear segment 33 though a 30° arc, rotates the conveyor boom section 30 on link member 44 through a corresponding angle of 30°. At the same time the pivot axis 52 has swung through an arc of 30° so that the resultant displacement of the longitudinal axis of the conveyor boom section 39 is 60° in a clockwise direction.

Conversely, the conveyor boom section 30 may be swung laterally in a counterclockwise direction by retraction of the piston rod 58 within the hydraulic cylinder 60. Retraction of the piston rod 58 rotates the conveyor boom section 30 in a counterclockwise direction relative to the main conveyor section 26. The gear segment 33 also rotates in a counterclockwise direction with the conveyor boom section 30 as the link member 44 rotates through a corresponding counterclockwise arc. Thus, the conveyor boom section 30 rotates in a counterclockwise direction relative to the main conveyor section 26 through an angle which is twice the angle of rotation of the conveyor boom section 30 on the link member 44 or the angle of rotation of the link member 44 relative to the main conveyor section 26.

Thus, it will be apparent from the present invention that the conveyor swivel section 34 provides for maximum rotation of the conveyor boom section 30 relative to the main conveyor section 26 with a relatively narrow pivotal section. The conveyor swivel section 34 provides increased lateral swinging movement of the conveyor boom section 30 in the operation of discharging dislodged material from the conveyor mechanism 16 of the mining machine 10 without requiring an enlarged pivotal section that would otherwise require an increased stroke of the hydraulic cylinder 60. Furthermore, the swivel section 34 limits the deformation of the flexible sidewalls 20 so that the radius to which they are bent is substantially expanded providing for smoother chain operation with less noise.

According to the provisions of the patent statutes, we have explained the principle, preferred construction and mode of operation of our invention and have described what we now consider to represent its best embodiments. However, it should be understood that within the scope of the appended claims, the invention may be practiced otherwise than as particularly illustrated and described.

We claim:

1. A conveyor comprising,
a pair of elongated conveyor sections arranged in end to end relationship,
a segment fixed to each conveyor section at its respective said end,
connecting means for interconnecting said segments of said conveyor sections to permit controlled relative movement of one segment with respect to the other segment,
a link member pivotally connected to each of said conveyor sections about axes coincident with the centers of said segments respectively,
means operatively connected to said link member for pivotally rotating said link member through an arcuate path, and
said means for pivotally rotating said link member including an extensible means connected to said link member and one of said conveyor sections.

2. A conveyor as set forth in claim 1 wherein,
said pair of elongated conveyor sections include a main conveyor section and a boom conveyor section respectively,
said main conveyor section being connected by a first pivot connection to said link member and thereby forming a first pivot axis perpendicular to the direction of material flow on said main conveyor section,
said conveyor boom section being connected by a second pivot connection to said link member and thereby forming a second pivot axis perpendicular to the direction of material flow on said conveyor boom section, and
said first and second pivot axes being spaced on said link member.

3. A conveyor as set forth in claim 2 which includes,
said segments each being pivotally connected to said link member and fixedly connected to said main conveyor section and said conveyor boom section about said first and second pivot axes respectively.

4. A conveyor as set forth in claim 2 which includes,
said segment associated with said main conveyor section being fixed relative thereto,
said segment associated with said conveyor boom section being fixed relative thereto so that as either of said segments rotates with respect to said other segment said conveyor boom section completes a corresponding rotation.

5. A conveyor as set forth in claim 2 which includes,
said link member being arranged to pivot about said main conveyor section and said segment associated therewith around said first pivot connection and about said conveyor boom section and said segment associated therewith around said second pivot connection such that said segment on said conveyor boom section rotates with respect to said segment on said main conveyor section to urge said conveyor boom section to rotate.

6. A conveyor as set forth in claim 2 which includes,
said extensible means being connected at one end to said link member and at the other end to said conveyor boom section such that upon actuation of said extensible means said conveyor boom section swings through an arc twice the angle of rotation of said link member with respect to said main conveyor section.

7. A conveyor as set forth in claim 6 in which said extensible means includes,
   a hydraulic cylinder assembly having a piston rod connected to said link member,
   said piston rod being operable to extend and retract within said hydraulic cylinder assembly to rotate the pivot connection between said link member and said conveyor boom section a preselected angle about the pivot connection between said link member and said main conveyor section so that said segment fixed to said conveyor boom section rotates about said segment fixed to said main conveyor section to thereby move said conveyor boom section twice the preselected angle of rotation of said link member.

8. A conveyor for a mining machine comprising,
   a mining macine body portion mounted on means for propelling said body portion,
   a conveyor support frame extending longitudinally on said body portion,
   a laterally flexible continuous conveyor positioned on said conveyor support frame,
   said conveyor support frame including a main conveyor section having a discharging end portion and a conveyor boom section having a receiving end portion positioned adjacent to said discharging end portion,
   means for linking said main conveyor section to said conveyor boom section at said adjacent end portions,
   gear means arranged in meshing relation and secured to said main conveyor section and said conveyor boom section for connecting said respective sections so that as said gear means associated with either of said sections rotates with respect to the other of said gear means a corresponding rotation of said respective conveyor section is completed, and
   means connected to said linking means and one of said conveyor sections to pivotally rotate said linking means through an arcuate path.

9. A conveyor for a mining machine as set forth in claim 8 wherein,
   said means to pivotally rotate said linking means comprises an extensible means.

10. A conveyor for a mining machine as set forth in claim 9 which includes,
    said main conveyor section being pivotally connected about a first pivot axis to said linking means and said conveyor boom section being pivotally connected about a second pivot axis spaced from said first pivot axis to said linking means.

11. A conveyor for a mining machine as set forth in claim 9 in which said linking means includes,
    a link member positioned in underlying relation with said main conveyor section and said boom conveyor section adjacent end portions,
    a first vertical pivot pin extending through said link member and secured to said main conveyor section and said gear means, and
    a second vertical pivot pin extending through said link member and secured to said conveyor boom section and said gear means to permit lateral swinging movement of said conveyor boom section relative to said main conveyor section and said link member.

12. A conveyor for a mining machine as set forth in claim 11 which includes,
    said link member being pivotally connected to said extensible means so that actuation of said extensible means pivots said link member about said main conveyor section and said gear segment associated therewith around said first vertical pivot pin and about said conveyor boom section and said gear segment associated therewith around said second vertical pivot pin.

13. A conveyor for a mining machine as set forth in claim 9 in which said gear means includes,
    a first gear segment fixed to said main conveyor section and positioned for rotation relative to said linking means about a first vertical pivot axis,
    a second gear segment fixed to said conveyor boom section and positioned in meshing relationship with said first gear segment,
    said second gear segment being secured for rotation relative to said linking means about a second vertical pivot axis, and
    said extensible means being operable to pivot said linking means relative to said main conveyor section so that said second gear segment rotates with respect to said first gear segment and said second vertical pivot axis rotates to swing said conveyor boom section through an arc twice the angle of rotation of said linking means relative to said main conveyor section.

14. A conveyor for a mining machine comprising,
    a mining machine body portion mounted on means for propelling said body portion,
    a conveyor support frame extending longitudinally on said body portion,
    a laterally flexible continuous conveyor positioned on said conveyor support frame,
    said conveyor support frame including a main conveyor section having a discharging end portion and a conveyor boom section having a receiving end portion positioned adjacent to said discharging end portion,
    means for linking said main conveyor section to said conveyor boom section at said adjacent end portions,
    first and second connecting means secured to said main conveyor section and said conveyor boom section for connecting said respective sections to permit controlled relative movement of one of said sections with respect to the other of said sections so that as said first and second connecting means associated with either of said sections rotates with respect to the other of said connecting means a corresponding rotation of said respective conveyor section is completed, and
    means connected to said linking means and one of said conveyor sections to pivotally rotate said linking means through an arcuate path.

* * * * *